United States Patent [19]

Vogel

[11] Patent Number: 5,447,560
[45] Date of Patent: Sep. 5, 1995

[54] METHOD FOR IMPROVING ERASABILITY OR ERASABLE MARKING COMPOSITIONS

[75] Inventor: Martin Vogel, Jenkintown, Pa.

[73] Assignee: Rohm and Haas Company, Philadelphia, Pa.

[21] Appl. No.: 206,303

[22] Filed: Mar. 3, 1994

[51] Int. Cl.6 .................... C09D 13/00; C08F 265/00
[52] U.S. Cl. ................... 106/20 A; 106/32; 525/301; 525/304; 525/305; 525/309; 525/312
[58] Field of Search ............. 106/20 A, 32; 525/301, 525/304, 305, 309, 312

[56] References Cited

U.S. PATENT DOCUMENTS

| | | |
|---|---|---|
| 4,427,836 | 1/1984 | Kowalski et al. . |
| 4,594,363 | 6/1986 | Blankenship et al. . |
| 4,677,003 | 6/1987 | Redlich et al. . |
| 4,920,160 | 4/1990 | Chip et al. . |
| 4,940,628 | 7/1990 | Lin ....................... 428/207 |
| 4,970,241 | 11/1990 | Kowalski et al. . |
| 4,988,123 | 1/1991 | Lin ....................... 281/15.1 |
| 5,120,359 | 6/1992 | Uzukawa ............... 106/20 |
| 5,203,913 | 4/1993 | Yamamoto ........... 106/22 B |
| 5,217,255 | 6/1993 | Lin ....................... 281/15.1 |
| 5,300,538 | 4/1994 | Loftin .................... 523/161 |
| 5,316,574 | 5/1994 | Fujita .................. 106/20 A |

FOREIGN PATENT DOCUMENTS

| | | |
|---|---|---|
| 267726 | 3/1987 | European Pat. Off. . |
| 0551913 | 7/1993 | European Pat. Off. . |
| 1301730 | 2/1989 | Japan . |
| 374440 | 8/1989 | Japan . |
| 374441 | 8/1989 | Japan . |
| 3227323 | 2/1990 | Japan . |
| 3237171 | 10/1991 | Japan . |
| 2103636 | 2/1983 | United Kingdom . |

*Primary Examiner*—Vasu S. Jagannathan
*Attorney, Agent, or Firm*—David T. Banchik; Wendy A. Taylor

[57] ABSTRACT

A method is disclosed for improving the erasability of erasable marking compositions, while maintaining the opacity of the coating and without producing burnishing, by incorporating into the compositions voided latex particles having a shell polymerized from either:
  (1) at least about 25% by weight, based on the weight of the shell, of a crosslinking comonomer;
  (2) at least about 5% by weight, based on the weight of the shell, of a crosslinking comonomer, when at least about 50% by weight of methyl methacrylate is used as a comonomer in the shell.

An improved liquid marking composition is also disclosed.

8 Claims, No Drawings

METHOD FOR IMPROVING ERASABILITY OR ERASABLE MARKING COMPOSITIONS

FIELD OF THE INVENTION

This invention relates to a method for improving the erasability of erasable marking compositions by incorporating into the compositions voided latex particles having a crosslinked shell.

BACKGROUND OF THE INVENTION

Chalk used to make markings on blackboards or chalkboards is typically made from calcium carbonate formed into a hard solid stick or cake. When the chalk is used, calcium carbonate is transferred to the blackboard surface. A large amount of calcium carbonate dust is also generated when the markings are made and when the blackboard erasers used to wipe away the markings are cleaned by slapping them together. This dust is more than just a housekeeping nuisance, it poses health concerns, especially in a classroom setting, because the inhalation of the dust may cause, inter alia, respiratory problems. In addition, the dust is harmful to electronic equipment, such as computers. Therefore, it is desirable to produce a marking medium useful on a standard blackboard or chalkboard which does not pose health and safety concerns.

Efforts have been made to produce marking media, such as, for example, liquid marking compositions, which do not generate dust or have other deleterious health effects. There has only been limited success in developing liquid marking compositions because, in the effort to produce a healthier marking medium, performance properties of the compositions have been compromised.

One problem is that the liquid marking compositions do not have the same whiteness or opacity on conventional blackboards as conventional chalk. Opacifiers have been added to solve this problem. As a result of the addition of the opacifying agents, however, many of the compositions lose their "erasability," i.e., they leave a hazy, whitish film on the dark blackboard or chalkboard after the board has been wiped with a conventional blackboard eraser or additionally wiped with water. The formation of this undesirable film is referred to as "ghosting."

Another problem with liquid marking compositions has been burnishing of the blackboard, i.e., a glazing, not associated with any physical abrasion, of the blackboard surface caused by a component of the liquid marking composition, such as soft, low melting point polymers and waxy materials.

SUMMARY OF THE INVENTION

I have discovered a method for improving the erasability of erasable marking compositions, while maintaining the opacity of the coating and without producing burnishing, by incorporating into the compositions voided latex particles having a shell polymerized from either:

(1) at least about 25% by weight, based on the weight of the shell, of a crosslinking comonomer; or
(2) at least about 5% by weight, based on the weight of the shell, of a crosslinking comonomer, when at least about 50% by weight of methyl methacrylate is used as a comonomer in the shell.

DETAILED DESCRIPTION OF THE INVENTION

The composition and method of this invention involve incorporating into conventional liquid marking compositions voided latex particles having crosslinked shells. The voided latex particles containing a core and a shell may be prepared by conventional polymerization techniques such as, sequential emulsion polymerization, including those processes disclosed in U.S. Pat. Nos. 4,427,836; 4,594,363; 4,677,003 4,920,160; 4,970,241, whose disclosures are incorporated herein by reference, and European Patent Application 0,267,726.

The methods disclosed in the aforementioned patents include a step of swelling the multistaged polymer particles with water or solvent in the wet state. Thus, the polymer particles do not become voided until the water or solvent inside the particles evaporates. Generally, this does not occur until the coating systems to which the polymer particles are added are allowed to dry. Because the polymer particles useful in the composition and method of this invention have a shell formed from a crosslinking monomer, they are resistant to swelling. Thus, it is preferable to polymerize the shell polymer after most of the swelling of the core has occurred, i.e., after the addition of base for an acid-rich core; after the addition of acid for an amine-rich core; and after the addition of solvent for a solvent-swellable core.

The voided latex particles useful in composition and method of this invention are formed from a multistaged polymer particle having a core polymer and a shell polymer, wherein the shell polymer is polymerized from either:

(1) at least about 25% by weight, based on the weight of the shell, of a crosslinking comonomer; or
(2) at least about 5% by weight, based on the weight of the shell, of a crosslinking comonomer, when at least about 50% by weight of methyl methacrylate is used as a comonomer in the shell.

The balance of the monomers used in the aqueous emulsion polymerization of the shell polymer may be at least 1% by weight one or more monoethylenically unsaturated monomers containing at least one carboxylic acid group and one or more non-ionic ethylenically unsaturated monomer.

"Crosslinking comonomer" as used herein refers to a polyfunctional monomer or mixture of monomers which crosslinks a polymer composition during the initial formation thereof. Subsequent drying or other curing techniques are not required. Comonomers of this type are well-known and include monomers wherein the functionality is of substantially equivalent reactivity so that uniform crosslinking occurs. Typically, such comonomers contain at least two addition polymerizable vinylidene groups and are α,β-ethylenically unsaturated monocarboxylic acid esters of polyhydric alcohols containing 2-6 ester groups. Suitable crosslinking comonomers include alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethacrylate; 1,3-glycerol dimethacrylate; 1,1,1-trimethylolpropane dimethacrylate; 1,1,1-trimethylolethane diacrylate; pentaerythritol trimethacrylate; 1,2,6-hexane triacrylate; sorbitol pentamethacrylate; methylene bisacrylamide, methylene bis-methacrylamide, divinylbenzene, vinyl methacrylate, vinyl crotonate, vinyl acrylate, vinylacetylene, trivinylbenzene, triallyl cyanurate, divinylacetylene, divinylethane, divinyl sulfide, divinyl ether, divinyl sulfone, diallyl cyanamide, ethylene glycol divinyl ether, diallyl phthalate, divinyldimethylsilane, glycerol trivinyl ether, divinyl adipate; dicyclopentenyl (meth)acrylates; dicyclopentenyloxy (meth)acrylates; unsaturated esters of glycol monodicyclopentenyl ethers; allyl esters of $\alpha,\beta$-unsaturated mono- and dicarboxylic acids having terminal ethylenic unsaturation including allyl methacrylate, allyl acrylate, diallyl maleate, diallyl fumarate, diallyl itaconate and the like. Allyl methacrylate is preferred. The term (meth)acrylate, as used herein, refers to both acrylate and methacrylate.

Suitable monoethylenically unsaturated monomers containing at least one carboxylic acid group include acrylic acid and methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, and monomethyl itaconate. Acrylic acid and methacrylic acid are preferred.

Suitable non-ionic ethylenically unsaturated monomers include styrene, vinyltoluene, ethylene, vinyl acetate, vinyl chloride, vinylidene chloride, acrylonitrile, (meth)acrylamide, ($C_1$-$C_{20}$) alkyl or ($C_3$-$C_{20}$) alkenyl esters of (meth)acrylic acid, such as methyl (meth)acrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate and stearyl (meth)acrylate. As used herein, the term "(meth)acrylic" is intended to serve as a generic expression embracing both acrylic and methacrylic.

The core polymer may be the product of aqueous emulsion polymerization of one or more monoethylenically unsaturated monomers containing at least one carboxylic acid group. The core polymer may be obtained by the emulsion homopolymerization of such a monoethylenically unsaturated monomer containing at least one carboxylic acid group or by copolymerization of two or more monoethylenically unsaturated monomers containing at least one carboxylic acid group. Preferably, the monoethylenically unsaturated monomer containing at least one carboxylic acid group is copolymerized with one or more non-ionic (that is, having no ionizable group) ethylenically unsaturated monomers.

The core polymer may also contain from about 0.1% to about 20% by weight, based on the weight of the total monomer weight of the core, preferably about 0.1% to about 3% by weight of polyethylenically unsaturated monomer, such as ethylene glycol di(meth)acrylate, allyl (meth)acrylate, 1,3-butane-diol di(meth)acrylate, diethylene glycol di(meth)acrylate, trimethylolpropane trimethacrylate, or divinylbenzene. Alternatively, the core polymer may contain from about 0.1% to about 60% by weight, based on the weight of the total monomer weight of the core, of butadiene.

The voided latex particles useful in the method of this invention are incorporated into the conventional liquid marking composition at a level of from about 5% to about 40%, based on the total weight of the liquid marking composition, and preferably from about 10% to about 25%, based on the total weight of the liquid marking composition.

The composition and method of this invention are useful for improving the erasability of both conventional aqueous-based and solvent-based liquid marking compositions. Conventional aqueous-based liquid marking compositions may contain water, volatile watermiscible solvents, such as methanol, to increase the rate of drying, soluble dyes, fine pigment particles, dispersants and thickeners. Conventional solvent-based liquid marking compositions may contain solvent, dyes, fine pigment particles, dispersants and thickeners.

The following examples illustrate the operation of the invention. These examples are intended merely to illustrate the invention and are not intended nor should they be interpreted as limiting the scope of the invention since modifications to the process illustrated are considered to be obvious to one of ordinary skill in the art.

EXAMPLE 1

Preparation of Liquid Marking Compositions

Comparative voided latex particles and voided latex particles useful in the composition and method of the invention were prepared by the method described in U.S. Pat. No. 4,427,836. Excess ammonia (1.3 equivalents based on the total equivalents of methacrylic acid in the particles) was added to the hot (8020 –85° C.) dispersion between the polymerizaton of shell II and shell III to convert the acid-rich core to the ammonium salt causing the core to swell with water. The final particle sizes averaged 400–550 nm and the solid content of the dispersions ranged from 32–43% by weight. All of the dispersions were diluted with water to 20% solids by weight to give the final liquid marking composition.

TABLE 1.1

Compositions of the Voided Latex Polymers
1 part core*//9 parts(20 BMA/78 MMA/2 MAA)(Shell I)//x parts(Shell II)// y parts(Shell III)*140 nm,5 BA/55 MMA/40 MAA

| Voided Latex Particles | Shell II | | Shell III | |
|---|---|---|---|---|
| | x | composition | y | composition |
| 1C | 22.5 | 100 Sty | 22.5 | 100 Sty |
| 2C | 22.5 | 100 Sty | 22.5 | 60 Sty/40 DVB-55 |
| 3C | 22.5 | 100 Sty | 22.5 | 75 Sty/25 ALMA |
| 4C | 22.5 | 100 Sty | 22.5 | 85 Sty/15 ALMA |
| 5 | 20 | 90 MMA/10 Sty | 20 | 75 MMA/10 Sty/15 ALMA |
| 6 | 4 | 100 Sty | 9 | 40 Sty/60 DVB-55 |

Notes:
The suffix "C" denotes a comparative.
Abbreviations
MMA    methyl methacrylate
BMA    butyl methacrylate
BA     butyl acrylate
MAA    methacrylic acid
Sty    styrene TABLE 1.1-continued Compositions of the Voided Latex Polymers
1 part core*//9 parts(20 BMA/78 MMA/2 MAA)(Shell I)//x parts(Shell II)//
y parts(Shell III)*140 nm,5 BA/55 MMA/40 MAA

| Voided Latex Particles | Shell II | | Shell III | |
|---|---|---|---|---|
| | x | composition | y | composition |

DVB-55   Dow 55% grade of divinylbenzene where most of remainder is ethylvinylbenzene
ALMA   allyl methacrylate

EXAMPLE 2

Performance Testing

Markers containing the formulations made in accordance with Example 1 were tested for erasability, burnishing and opacity by marking on both a slate chalkboard and a composition chalkboard at both one cycle and 50 cycles. One cycle is covering a 1-inch-by-2-inch rectangle on the chalkboard surface and erasing the marking using a conventional chalkboard eraser. Fifty cycles is repeating the process 50 times.

Erasability Testing

The erasability of each formulation was judged by how well it could be removed, using a conventional chalkboard eraser, in comparison to the erasability of a similar marking made using conventional calcium carbonate chalk. The results are shown in Table 2.1.

Burnishing Testing

The burnishing of each formulation was judged by how much glazing of the chalkboard surface appeared which was not a result of physical abrasion. The results are shown in Table 2.1.

Opacity Testing

The opacity of each formulation was judged by how well the marking developed solid whiteness when dry. The results are shown in Table 2.1.

TABLE 2.1

| Formulation containing Voided Latex Polymer | Performance Results | | |
|---|---|---|---|
| | Erasability | Burnishing | Opacity |
| 1C | ghosting - fail | yes - fail | good (white) |
| 2C | ghosting - fail | yes - fail | fair (white) |
| 3C | ghosting - fail | yes - fail | fair (white) |
| 4C | ghosting - fail | yes - fail | good (white) |
| 5 | good (no ghosting) - pass | no - pass | good (blue-white) |
| 6 | good (no ghosting) - pass | no - pass | good (white) |

The results indicate that formulations containing voided latex particles having a shell polymerized from either:

(1) at least about 25% by weight, based on the weight of the shell, of a crosslinking comonomer; or (2) at least about 5% by weight, based on the weight of the shell, of a crosslinking comonomer, when at least about 50% by weight of methyl methacrylate is used as a comonomer in the shell exhibit good erasability (no ghosting) while maintaining the opacity of the coating and without producing burnishing.

I claim:

1. A method of improving the erasability of an erasable marking composition, comprising incorporating into said composition voided latex particles formed from a multistaged polymer particle having a core polymer polymerized from ethylenically unsaturated monomers and having a shell polymerized from at least about 25% by weight, based on the weight of the shell, of an ethylenically unsaturated crosslinking comonomer.

2. A method of improving the erasability of an erasable marking composition, comprising incorporating into said composition voided latex particles formed form a multistaged polymer particle having a core polymer polymerized from ethylenically unsaturated monomers and a shell polymerized from at least about 50% by weight of methyl methacrylate and from at least about 5% by weight, based on the weight of the shell of an ethylenically unsaturated crosslinking comonomer.

3. The method of claims 1 or 2 wherein said crosslinking comonomer is a comonomer selected from the group consisting of alkylene glycol diacrylates, alkylene glycol dimethacrylates, 1,3-glycerol dimethacrylate, 1,1,1-trimethylolpropane dimethacrylate, 1,1,1-trimethylol ethane diacrylate, pentaerythritol trimethacrylate, 1,2,6-hexane triacrylate, sorbitol pentamethacrylate, methylene bis-acrylamide, methylene bis-methacrylamide, divinylbenzene, vinyl methacrylate, vinyl crotonate, vinyl acrylate, vinyl acetylene, trivinyl-benzene, triallyl cyanurate, divinylacetylene, divinylethane, divinyl sulfide, divinyl ether, divinyl sulfone, diallyl cyanamide, ethylene glycol divinyl ether, diallyl phthalate, divinyldimethylsilane, glycerol trivinyl ether, divinyl adipate, dicyclopentenyl (meth)acrylates; dicyclopentenyloxy (meth)acrylates, unsaturated esters of glycol monodicyclopentenyl ethers, allyl esters of α,β-unsaturated monocarboxylic acids having terminal ethylenic unsaturation and allyl esters of α,β-unsaturated dicarboxylic acids having terminal ethylenic unsaturation.

4. The method of claims 1 or 2 wherein said crosslinking comonomer is a comonomer selected from the group consisting of an allyl ester of α,β-unsaturated monocarboxylic acid having terminal ethylenic unsaturation and α,β-unsaturated dicarboxylic acid having terminal ethylenic unsaturation.

5. The method of claims 1 or 2 wherein said crosslinking comonomer is allyl methacrylate.

6. The method of claims 1 or 2 wherein said voided latex particles have a core formed from at least one acid-functional comonomer and wherein said shell is polymerized after the addition of a base to said core.

7. The method of claims 1 or 2 wherein said voided latex particles have a core formed from at least one amine-functional comonomer and wherein said shell is polymerized after the addition of an acid to said core.

8. The method of claims 1 or 2 wherein said voided latex particles have a solvent-swellable core and wherein said shell is polymerized after the addition of a solvent to said core.

* * * * *